(12) United States Patent
Schlosser et al.

(10) Patent No.: US 6,253,089 B1
(45) Date of Patent: Jun. 26, 2001

(54) SYSTEM FOR TRANSFERRING INFORMATION FROM A BASE STATION TO PORTABLE PHONES

(75) Inventors: Knut Haberland Schlosser, Bochum (DE); Anders Grove, Holte; Lars Bergmann, Vallensbaek, both of (DK)

(73) Assignee: Nokia Mobile Phones Limited, Salo (FI)

( * ) Notice: Subject to any disclaimer, the term of this patent is extended or adjusted under 35 U.S.C. 154(b) by 0 days.

(21) Appl. No.: 08/758,970

(22) Filed: Dec. 2, 1996

(30) Foreign Application Priority Data

Dec. 4, 1995 (DK) .................................................. 1374/95

(51) Int. Cl.[7] ...................................................... H04Q 7/20
(52) U.S. Cl. ............................ 455/465; 455/415; 455/566
(58) Field of Search ........................ 379/58, 61; 370/329; 455/563, 414, 415, 458, 465, 466, 566, 567

(56) References Cited

U.S. PATENT DOCUMENTS

| | | | |
|---|---|---|---|
| 5,103,448 | * 4/1992 | Barnes et al. | 455/465 |
| 5,255,308 | 10/1993 | Hashimoto et al. | 379/61 |
| 5,371,781 | 12/1994 | Ardon | 379/59 |
| 5,533,096 | * 7/1996 | Bales | 379/58 |
| 5,646,979 | * 7/1997 | Knuth | 455/563 |
| 5,703,934 | * 12/1997 | Zicker et al. | 379/61 |
| 5,734,645 | * 3/1998 | Raith et al. | 370/329 |

OTHER PUBLICATIONS

European Search Report date Jun. 10, 1999.
Struktur des DECT–Standard, pp. 23–29.
European Telecommunication Standard, Oct. 1992, 237 pages.

* cited by examiner

Primary Examiner—Edward F. Urban
(74) Attorney, Agent, or Firm—Perman & Green, LLP

(57) ABSTRACT

A system for establishing a telephone connection to a portable telephone in a telephone system, comprises a telephone line connected to a base station, a plurality portable telephones each connectable to telephone line via the base station. The base station monitors the telephone line and outputs a trigger signal when it detects ringing at the telephone line. The trigger signal comprises an address or an ID for the address which addresses at least a group of the plurality of telephones whereby the telephones receiving the trigger signal starts ringing. The base station later on outputs an information signal which comprises the same address or ID for the address as the trigger signal and information about the caller, whereby the addressed telephones are provided with the information about the caller. Each of the telephones which are ringing comprises establishing a communication link from the phone to the base station when the telephone is activated as a response to the ringing.

17 Claims, 1 Drawing Sheet

SYSTEM FOR TRANSFERRING INFORMATION FROM A BASE STATION TO PORTABLE PHONES

BACKGROUND OF THE INVENTION

The invention relates to a system for establishing a telephone connection to a portable telephone in a telephone system, comprising a telephone line connected to a base station, a plurality portable telephones each connectable to telephone line via said base station. The invention furthermore relates to a system for transferring short messages to a portable telephone in a telephone system, from a base station to one among a plurality portable telephones each connectable to said base station.

A DECT system is a telephone system where a number of portable telephones via a base station are connected to the common telephone net. The portable phones are used in an office or at home without necessarily having a person dedicated to each phone. When this is the situation the base station has to call the portable phones successively to find a person who can answer the call. Very often the call has to be passed from the person who answers the call to the person the caller actually wants to call. In some cases the caller is not able to dial the person directly or know how to dial him directly.

There is a need for a telephone system comprising a base station which is able to provide the portable phones with information about the caller so a person who intends to respond the ringing can examine whether he is the right person to respond the call. This information is accessible as an A-number in the digital common telephone systems (ISDN). However the present cordless or DECT systems are due to communication standards not at the moment able to transfer this information to the portable unit during collectively ringing.

SUMMARY OF THE INVENTION

According to the invention the base station in the system for establishing a telephone connection to a portable telephone monitors the telephone line and outputs a trigger signal when a ringing signal is detected at the telephone line. The trigger signal comprises an address which addresses at least a group of the plurality of the phones connectable to the base station whereby the phones receiving said trigger signal starts ringing. Later on the base station output an information signal which comprises the same address as the trigger signal and information about the caller. All the addressed telephones are now provided with said information about the caller. Each of the phones which are ringing comprises means for establishing a communication link from the phone to the base station when the telephone is activated as a response to the ringing.

The portable phones addressed by the trigger signal from the base station will then be in a mode where they more intensively monitor the activity in the data frames send by the base station to pick up said information signal. The trigger signal may preferably be transferred as a short format message used in a DECT system. This type of messages contains according to the present standards three bytes. The information signal may be transferred as a data sequence transferred in sequences of data frames. The information signal may preferably be provided as a CLMS-FIXED message which according to the present standards contains at least five octets of data.

The short format message used in a DECT system contains only three bytes which is not sufficient to transfer ID information about the caller. The CLMS-FIXED message comprises information about the connection to be set and about the kind of connection. The CLMS-FIXED message can be varied in length. However a portable phone will not be able to ensure the reception of the CLMS-FIXED message as long as the phone is in a passive state (low-duty-cycle idle-locked mode). A portable phone can receive a short format message containing an ID for the receiver address which enters the phone into an active mode (idle-locked mode), and when the phone later on receives the CLMS-FIXED message containing the very same ID for the address of the portable phone, said phone will be able to link the two message signals to identify the caller.

The portable telephone may comprise a display for displaying said information about the caller, e.g. the A-number. Preferably the portable telephone may comprise means for interrupt the ringing when another person answers the call.

The invention furthermore relates to a telephone system comprising means for transferring short messages from a base station to at least one among a plurality of portable telephones each connectable to said base station. The base station is controlled to output a short trigger signal including an ID for the address which addresses at least a one of said plurality of telephones whereby said at least one telephone receiving said trigger signal starts intensively monitoring the data frames produced by the base station whereby the portable phone is able to receive the CLMS-FIXED messages. Later on the base station output an information signal in form of CLMS-FIXED messages into the data frames where said information signal comprises the same ID for the address as the trigger signal and the short message to be transferred to said at least one telephone.

Hereby the phone can be loaded with information, e.g. default ID for the address, new services, without disturbing the owner of the phone.

BRIEF DESCRIPTION OF THE DRAWINGS

The invention will in the following be described in details in connection with a preferred embodiment.

DETAILED DESCRIPTION OF THE INVENTION

Figure 1:
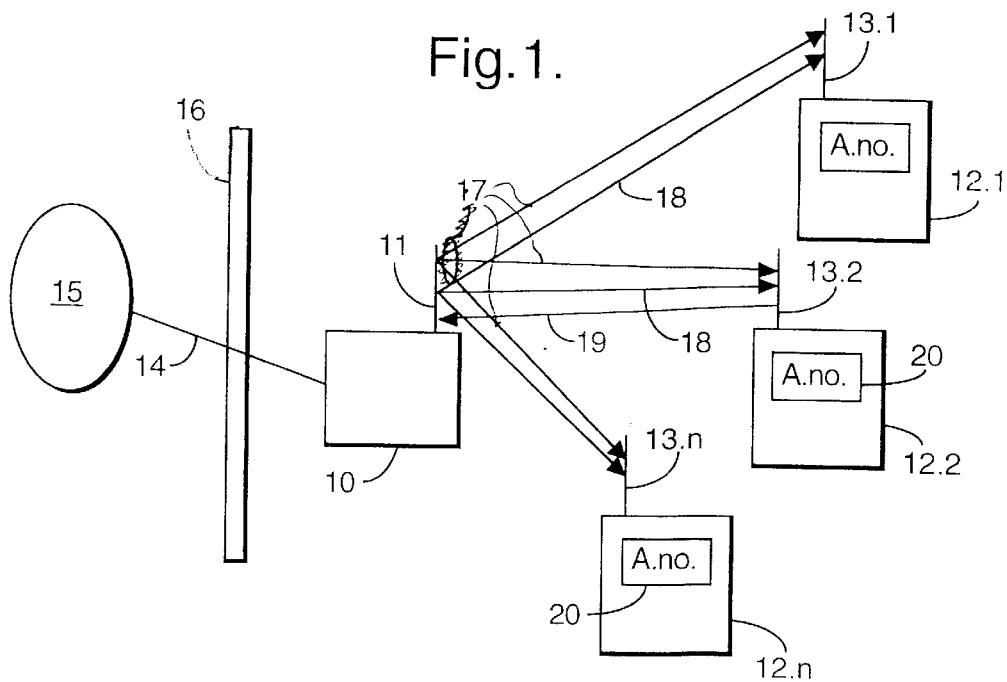
FIG. 1 shows the set up for the base station in the telephone system according to the invention.

The system according to the invention is shown in FIG. 1. When a call is received by a base station (fixed part) 10 from an external caller (indicated by a wall 16) via an incoming line 14 from a common telephone net 15 the base station 10 has to connect the caller to a portable phone 12.1–12.n. This is done by an airborne signal link via respective antennas 11, 12.1–12.n.

Figure 2:
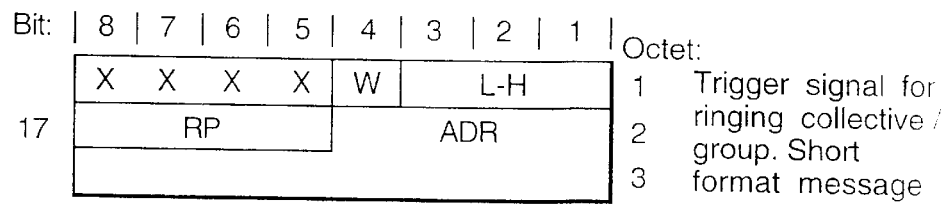
FIG. 2 shows the content of the trigger signal and the information signal used in the system according to the invention.
Figure 2:
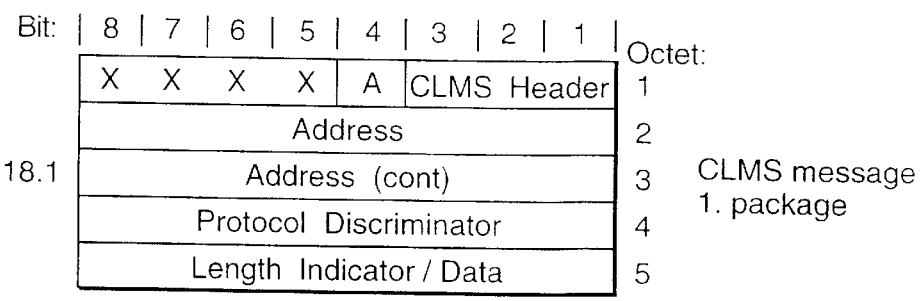
Figure 2:
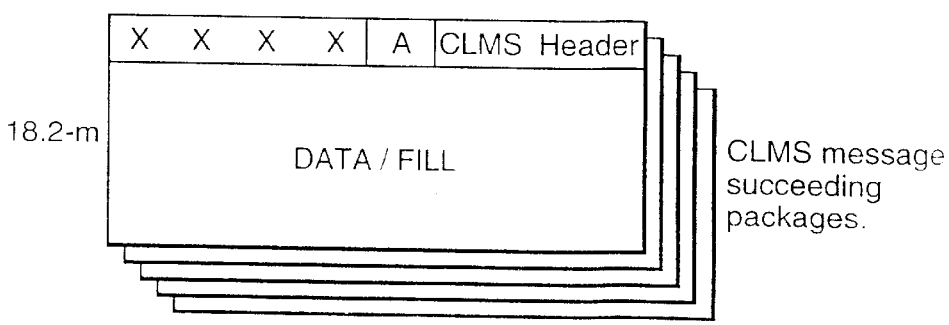

When the fixed part (F-IWU) detects ringing on the incoming telephone line 14 it transmits a trigger signal 17 for a collective call or a group call. The portable phone's 12.1–12.n addressed by the trigger signal 17 will simultaneously start ringing. The trigger signal 17 consists in the preferred embodiment of a page message in form of a short format message which is standard in a DECT system. The possible composition of such a trigger signal is shown in FIG. 2. The length of the page message will be three bytes in the actual standards. The page message contains an ID for the receiver address of at least a group among the portable phone's 12.1–12.n.

When a portable part (P-IWU) receives the page message 17 it starts ringing if addressed. The P-MAC (the next lowest layer in the protocol stack for portable phones DECT base standard) switches at the same time from a passive mode (low-duty-cycle idle-locked mode) to an active mode (idle-locked mode). In the passive mode the phone does not monitor the content of the data frames send by the fixed part. In the active mode the phone starts monitoring whereby the portable part will be able to receive CLMS messages 18 which according to the standard mainly contains information about the connection to be set and about the type of connection. The CLMS-FIXED message 18 is presently preferred by the inventor as information carrier. The CLMS-FIXED message 18 can be varied in length. The information can be put together in message's 18.1–18.m in successive data frames. When portable phone 12.1–12.n receives the CLMS-FIXED message 18.1–18.m containing the very same ID for the receiver address as in the page message 17 the portable phone 12.1–12.n will be able to link the two message signals. When the CLMS message contains information about the caller the portable phone will due to the link be able to identify the caller.

In the preferred embodiment portable telephone 12.1–12.n comprises a display 20 for displaying said information about the caller, e.g. the A-number or even the name of the caller, if the fixed part or the portable phone contains a data base or a look up table containing numbers and names of frequently callers. Preferably the portable telephone may comprise means for interrupt the ringing if the call is responded by another phone. This information is transferred by the CLMS FIXED message.

The structure of the short format message 17 is shown in FIG. 2. The short format message 17 contains 3 bytes. The first four bits are dummy (do not care). The W bit informs about the use of assigned or default TPUIs or about collective/group/group-mask usage in the ringing case. The LCE-Header bits inform about the nature of the broadcast message. Bits 5–8 of octet 2 indicate the ringing pattern and bits 1–4 of octet 2 and octet 3 contain parts of the TPUI, a group mask or the CBI (collective broadcast identifier).

The CLMS-FIXED message can be composed as shown in FIG. 2. The first octet in the first CLMS-FIXED message 18.1 comprises four dummies (do not care) bits and an A bit indicating whether the CLMS-FIXED message contains more than one package of five octets. The last three bits in the first octet are a CLMS header. The next two octets contain address, identity and CBI (collective broadcast identifier). The fourth octet may contain a protocol discriminator. The fifth octet contains data and information about the total length of the message including data in following package's 18.2–18.m. Subsequently packages contain the same first octet as the first package and contain data in the remaining time.

The A-number or the other information about the caller transferred to the portable phone may be displayed in the display 20.

If the addressed portable phone 12.1–12.n are in the low-duty-cycle idle-locked mode they will change to the idle-locked mode due to the reception of the short format message 17. When the call is answered by one of the addressed phones the call is initiated by the right phone 12.1–12.n by CC-SETUP according to ETS 300 175-5. In FIG. 1 the portable phone 12.2 set up a link 19 to the base station 10.

In this document it is shown how information such as an A-number transmission can be realized during a collective/group/group-mask ringing procedure without changing of the base standard. The standard for the DECT system is given in ETSI standard ETS 300 175, edition 2.

If the base station contains a database information about the caller the base station may link this information with the A-number and supply this information to the portable phone in question via the CLMS-FIXED message.

It is furthermore possible from the base station 10 to transfer short messages to one or more of the portable telephone's 12.1–12.n in a telephone system. The base station has to be controlled to output a short format message as a trigger signal including an address or an ID for the address which addresses at least a one of said plurality of telephones whereby said at least one telephone receiving said trigger signal starts monitoring data frames produced by the base station. The addressed portable phone 12.1–12.n will hereby switch from the low-duty-cycle idle-locked mode to the idle-locked mode due to the reception of the short format message 17. When the base station later on outputs an information signal into the data frames, said information signal comprises the same address as the trigger signal and the short message to be transferred. The addressed phone will be able to pick up the transmitted information. Hereby the phone can be loaded with information, e.g. default ID for the address, new services, without disturbing the owner of the phone.

In the following some even more detailed examples are given. Information transfer to portable phones by means of collective/group/group-mask broadcast services.

Information Transfer to Portable Telephones by Means of Collective/Group/Group-Mask Broadcast Services.

For a normal incoming call, the {CC-SETUP} message provides the portable telephones with information for the call before the alerting starts. As the collective ringing in the standards uses the short format message, this can not be done by this message.

According to the invention it is suggested to use a connectionless broadcast feature by e.g. the {CLMS-FIXED} message, with the ability to transfer up to 30 bytes, to provide the portable telephones with information, especially during collective/group/group-mask ringing.

According to the invention the address field of this message uses the same identifiers as used in the short format message for the ringing. Hereby is provided a rather simple way to broadcast information, which could be especially powerful for proprietary and business use by applying the "user specific" coding within the Protocol Discriminator field in the {CLMS-FIXED} message.

In the following will be outlined a few possible ways to make a connectionless broadcast depending on which kind of ringing shall be cared for. Possible decisions for ringing with short message format. The following possibilities are possible according to the invention:

1. Collective Ringing.

If the intention is just to fulfill the needs for supplying such information at collective ringing (not group ringing or ringing by group mask), then the address field of the {CLMS-FIXED} message could be assigned the value CFFFh.

The value CFFFh of the connectionless broadcast identifier (CBI) is reserved from the connectionless group TPUI's in the base standard for this purpose. If a portable telephone has received a short format message with LCE header coding "Unknown (MAC service type) & Ringing" and then receives a {CLMS-FIXED} message with this identity in the address field, it should understand the information as relating to the preceding collective ringing.

If a portable telephone has received a short format message with LCE header coding "None" and then receives a {CLMS-FIXED} message with this identity in the address field, it should understand this as collective broadcast information.

2. Group Ringing.

If the intention is to fulfill the same need for such information for group ringing, we could use the connectionless group TPUI to address the relevant portable telephones.

If a portable telephones belonging to this call group has received a group ringing short format message (LCE header coding "Unknown (MAC service type) & Ringing"), and then receives a {CLMS-FIXED} message with this identity in the address field, it should understand the information in this message as relating to the preceding group ringing.

If a portable telephone has received a short format message with LCE header coding "None" and then receives a {CLMS-FIXED} message with this identity in the address field, it should understand this as group broadcast information 3. Group Mask Ringing.

If the intention is to fulfill the same need for such information for group mask ringing, we could use the group mask to address the relevant portable telephones. The group mask is distinguished from the connectionless group TPUI by the 'W'-bit in the short format message indicating ringing.

If a portable telephones connectionless TPUI matches this group mask in a group mask ringing short format message (LCE header coding "Unknown (MAC service type) & Ringing"), and then receives a {CLMS-FIXED} message with this identity in the address field, it should understand the information in this message as relating to the preceding group ringing.

What is claimed is:

1. System for establishing a telephone connection to an arbitrary portable telephone among a group of telephones upon the occurence of an incoming call, said system comprising:
   at least one base station communicating with a plurality of portable telephones including said group of telephones, and wherein each of the telephones in said group has a common address,
   means, responsive to an incoming call, for causing said at least one base station to output a trigger signal to said group of telephones, said trigger signal comprising an address, or an ID for the address, which addresses the common address of said group of telephones to produce collective ringing,
   means for causing said at least one base station to also output to said group of telephones an information signal, which comprises the same address, or ID for the address, as comprised by the trigger signal and information about the incoming call to provide the addressed telephones with said information about the call,
   means at each of the collectively ringing telephones, for establishing a communication link from a portable telephone to the base station when the portable telephone is activated as a response to the ringing and deactivating the ringing at the other collectively ringing telephones.

2. System according to claim 1, further comprising means for causing said plurality of portable telephones to enter a mode wherein the activity in data frames sent by the base station is monitored to pick up said information signal.

3. System according to claim 2, wherein the portable telephone comprises a display means for displaying said information about the call.

4. System according to claim 2, wherein the portable telephone comprises means for interrupting the ringing when the call has been responded to by another telephone.

5. System according to claim 2, wherein the information about the call comprises the telephone number (A-number) of the caller.

6. System according to claim 1, wherein said base station and said group of telephones communicate by the DECT system and the trigger signal is included as information transferred as short format message used in the DECT system.

7. System according to claim 6, wherein the trigger signal is provided as a page message containing three bytes.

8. System according to claim 1, wherein the information signal is included as information transferred in a data frame.

9. System according to claim 8, wherein the information signal is provided as a CLMS-FIXED message containing at least five octets of data.

10. Method for establishing a telephone connection to an arbitrary portable telephone, among a group of telephones having a common address, upon the occurence of an incoming call, said method comprising the steps of:
    outputting a trigger signal for initiating collective ringing of said group of telephones when an incoming call occurs, said trigger signal comprising an address, or an ID for the address, which addresses the common address of said group of telephones;
    outputting an information signal to said group of telephones, said information signal comprising the same address, or ID for the address, as comprised in the trigger signal and information about the caller in order to provide the addressed telephones with information about the caller;
    displaying the information about the caller in each of the collectively ringing telephones; and
    establishing a communication link from one of said group of telephones when a user of said one of said group accepts responding to the incoming call and deactivating the ringing in the other collectively ringing telephones.

11. Method according to claim 10, wherein said group of telephones enter a mode wherein the activity in data frames sent with the incoming call is monitored to pick up said information signal.

12. Method according to claim 11, wherein the monitoring comprises using display means on each of the collectively ringing telephones for displaying said information about the caller.

13. Method according to claim 10, wherein the trigger signal is included as information transferred as a short format message used in the DECT system.

14. Method according to claim 13, wherein the trigger signal is provided as a page message containing three bytes.

15. Method according to claim 10, wherein the information signal is included as information transferred in a data frame.

16. Method according to claim 15, wherein the information signal is provided as a CLMS-FIXED message containing at least five octets of data.

17. Method according to claim 10, wherein the information about the caller comprises the telephone number (A-number) of the caller.

* * * * *

UNITED STATES PATENT AND TRADEMARK OFFICE
CERTIFICATE OF CORRECTION

PATENT NO. : 6,253,089 B1
DATED : June 26, 2001
INVENTOR(S) : Schlosser et al.

Page 1 of 1

It is certified that error appears in the above-identified patent and that said Letters Patent is hereby corrected as shown below:

Title page,
The title "SYSTEM FOR TRANSFERRING INFORMATION FROM A BASE STATION TO PORTABLE PHONES" should read -- SYSTEM FOR ESTABLISHING A TELEPHONE CONNECTION TO ONE PHONE AMONG A GROUP OF PHONES RECEIVING AN INCOMING CALL --.

Column 6,
Line 10, after "transferred as" insert -- a --.

Signed and Sealed this

Fourteenth Day of May, 2002

Attest:

JAMES E. ROGAN
*Attesting Officer*  *Director of the United States Patent and Trademark Office*